Figure 1:
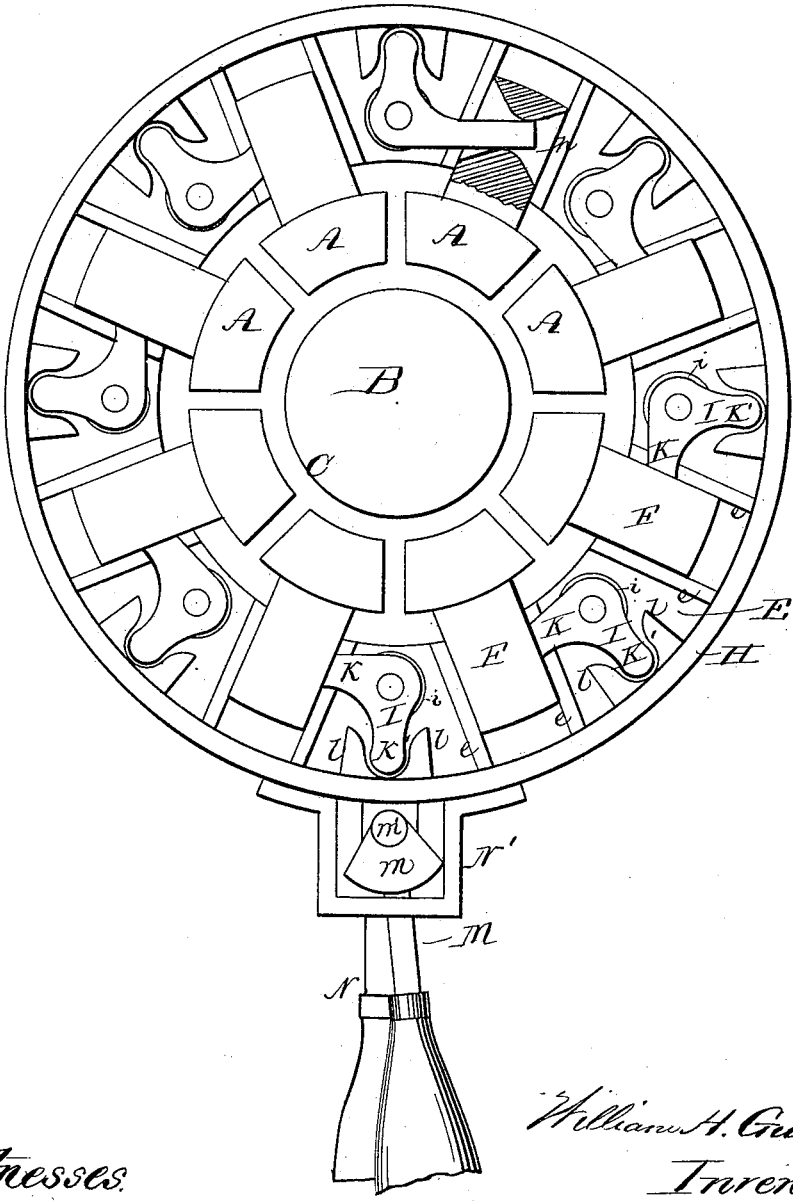

(No Model.) 2 Sheets—Sheet 1.

W. H. GULLIVER.
GLASS MOLD.

No. 337,764. Patented Mar. 9, 1886.

Witnesses.
A. A. Moore,
A. A. Connolly

William H. Gulliver
Inventor
by Connell Bros
Attys (No Model.)
W. H. GULLIVER.
GLASS MOLD.
No. 337,764.  Patented Mar. 9, 1886.
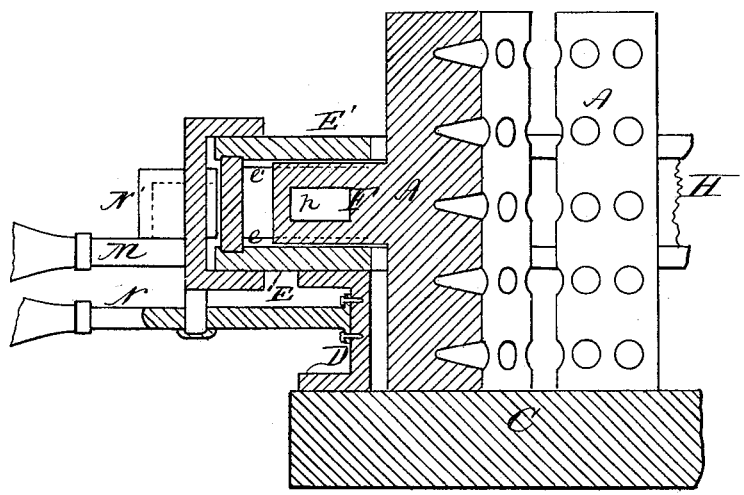

UNITED STATES PATENT OFFICE.

WILLIAM H. GULLIVER, OF PHILLIPSBURG, PENNSYLVANIA.

GLASS-MOLD.

SPECIFICATION forming part of Letters Patent No. 337,764, dated March 9, 1886.

Application filed November 18, 1885. Serial No. 183,217. (No model.)

*To all whom it may concern:*

Be it known that I, WILLIAM H. GULLIVER, a citizen of the United States, residing at Phillipsburg, in the county of Beaver and State of Pennsylvania, have invented certain new and useful Improvements in Glass-Molds; and I do hereby declare the following to be a full, clear, and exact description of the invention, reference being had to the accompanying drawings, which form part of this specification.

This invention has relation to molds for the manufacture of fancy glassware, and has for its object the provision of a novel construction of mold from which objects having molded on their surfaces figures or forms of high elevation or relief may be withdrawn without impairing or in any manner injuring said forms or figures.

Molds for the production of fancy glass objects have heretofore been made in two or more parts or sections hinged together, the inner surfaces of the sections being cut to the pattern of the figures or forms to be produced. In this construction of mold the pattern-figures can be of only limited depth, and will therefore produce but slightly elevated figures or forms upon the surface of the glass, for the reason that in opening the mold the molded figures or projections on the soft glass are impinged upon by the body of the mold and the sides and angles of the recesses cut in the inner surface of the mold, and are thereby bent and partially obliterated when the pattern recesses in the mold are deep and other than of tapering form. In a two-part mold the sections or halves do not separate on radial lines, but describe curves which are eccentric with reference to the axis of the mold; hence the molded figures or forms are caught by the sides of the pattern-figures, and if such molded figures or projections are in high relief they are necessarily bent in the direction of the curves described by the different parts of the mold.

My invention consists in the novel construction of a mold wherein, instead of having two sections hinged together and opening in the direction of eccentric curves, I employ a number of segmental sections so constructed, arranged, and combined with mechanism for operating them that said sections will move radially, and thereby expand the cavity of the mold to such an extent that the molded object may be readily withdrawn. With a mold of this character figures or forms of any depth may be correctly produced, as the sections in the opening or expansion of the mold move exactly in lines coinciding with the axes and sides of the projected figures, and leave the glass immediately upon the partial expansion of the mold. The molded figures are accordingly exact reproductions in relief of the pattern-figures in the mold, and are in no wise injured or impaired by the operation of withdrawing the glass from the mold.

Referring to the accompanying drawings, Figure 1 is a plan view of my improved mold with the cap-ring removed to show the mechanism for expanding the mold, and Fig. 2 a vertical central section of the mold.

A designates the segmental sections composing the mold proper and inclosing the mold space or cavity B, of any desired shape or contour. The patterns or figures to be reproduced on the glass are cut in the inner surfaces of the sections in the usual way and according to the design to be obtained. The lines or spaces dividing the sections are exactly radial to the axis of the mold, and are clearly shown in Fig. 1, which represents the mold as partially open or expanded. The sections A A rest and move upon a base-plate, C, and from the latter rise the L-shaped standards D, supporting on their upper ends the ring or annular plate E, which constitutes the base of a box or casing containing the mechanism through which the sections of the mold are moved in and out. This plate is encircled by a ring or flange, H, upon which rests and to which is secured another annular plate, E', exactly corresponding with the plate E. The two plates E and E' are formed with the guides $e\ e'$, which are arranged in pairs, those of each pair being parallel to each other, and with radial lines proceeding from the center of the mold.

The mold-sections are each formed or provided with a horizontal arm or slide, F, rectangular in vertical cross-section and extending radially from the back part of the section, so as to enter the channel formed by guides $e\ e'$ in the rear of the section. These arms are slotted, as shown at $h$, and between each pair of guides on the lower plate, E, is pivoted an elbow-lever, I, the pintle of which is inserted in bosses *i* in the plates E E'. One arm, K, of said lever projects into the slot in the next adjacent slide, F, while the other arm, K', which is rounded on its extremity, enters a recess formed by the studs *l l*, projecting inwardly from the ring H, these studs being beveled, as shown, to afford bearing-surface for the end of the lever-arm. The levers I alternate with the slides F, and constitute the mediums through which the mold-sections are moved inwardly and outwardly and the mold opened and closed. The ring H, which in turning upon the lower plate, E, and between the plates E and E', causes the levers I to move upon their pivotal points and the mold-sections to move inwardly or outwardly, according to the direction of movement of the ring H, is operated through and by a cam-lever, M, having upon the inner end the segmental cam *m* and the pintle *m'*, the latter having its bearing in one of the arms N, by which the mold is lifted, or in a block or bracket attached to or formed on the mold-frame. A box or U-shaped casing, N', is secured to the ring H for the reception of the cam, and against the sides of this box the cam impinges when the lever M is operated for the purpose of moving the ring and effecting the opening or closing of the mold. It will be observed that the cam projects rearwardly from the end of the lever M, the object being to shorten the movement of the lever, in order to produce the required movement of the ring.

As will be seen, all the mold-sections are moved simultaneously and by the operation of the lever M in either direction, the movement of the latter in one direction causing the mold to open, while its movement in the opposite direction causes the mold to close.

Having described my invention, what I claim, and desire to secure by Letters Patent, is—

1. In a glass-mold, the combination, with segmental mold-sections adapted to move on radial lines, of an encircling ring or band and pivotal levers contacting with said ring and with said sections, whereby when the ring is turned the sections will be moved, substantially as described.

2. In a glass-mold, the combination, with the segmental and radially-movable mold-sections A A, having the slides or sliding blocks F, of the plates E E', formed with guides *e e'*, the elbow-levers I, ring H, having studs *l l*, and the cam-lever M, substantially as described.

In testimony that I claim the foregoing I have hereunto set my hand this 16th day of November, 1885.

WILLIAM H. GULLIVER.

Witnesses:
THOS. A. CONNOLLY,
JNO. F. ATCHESON.